Nov. 20, 1956　　W. L. EFFINGER, JR　　2,771,212
ROCKET POWER UNIT
Filed Feb. 8, 1955
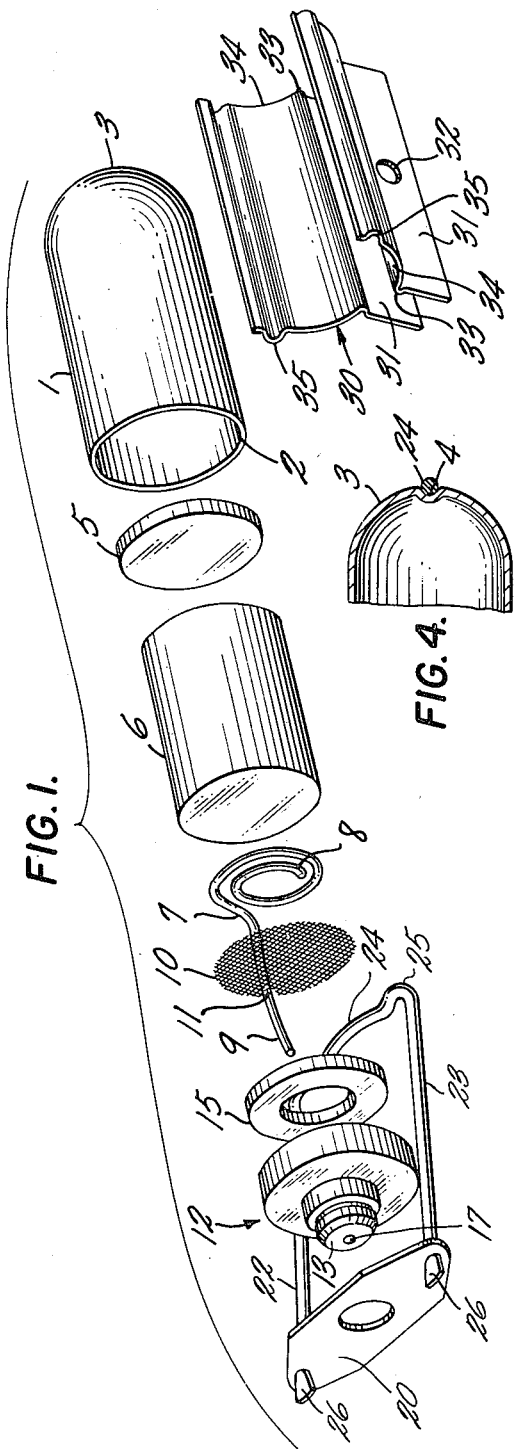
FIG. 1.
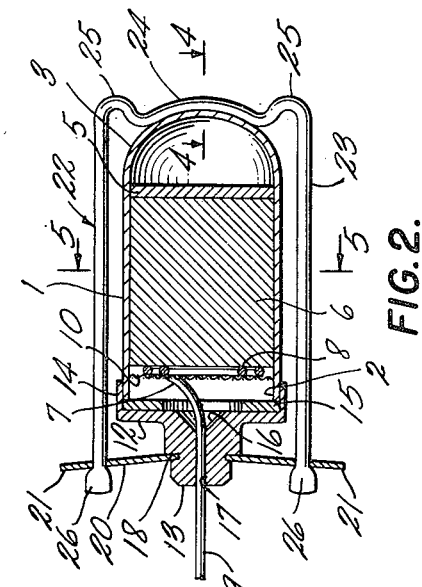
FIG. 4.
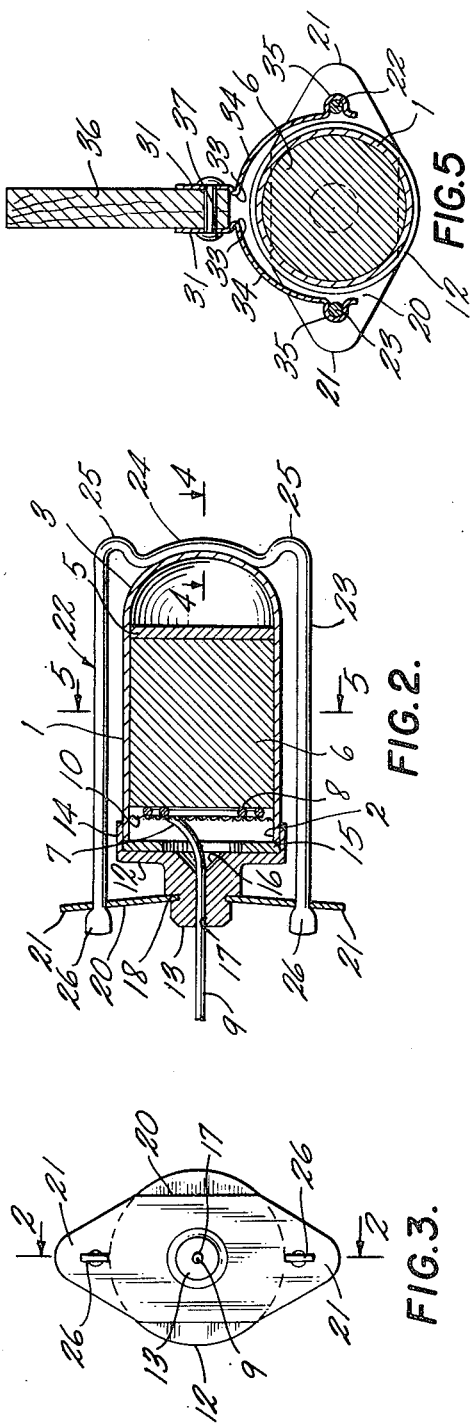
FIG. 2.
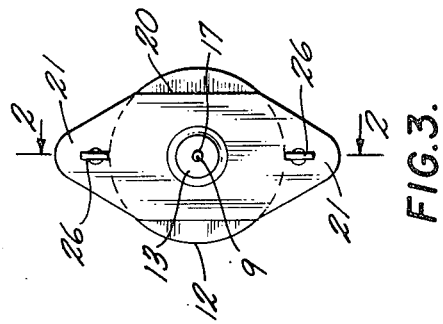
FIG. 3.
FIG. 5

United States Patent Office 2,771,212
Patented Nov. 20, 1956

2,771,212
ROCKET POWER UNIT
William L. Effinger, Jr., Glen Cove, N. Y.

Application February 8, 1955, Serial No. 486,752

6 Claims. (Cl. 102—34)

The present invention relates to a jet rocket power unit for model airplanes, boats, cars and other vehicles. The unit in accordance with the invention is a self-contained power unit adapted to be mounted on a model airplane and operable to develop thrust for propelling the plane in the manner of a jet engine. However, it is a rocket rather than a turbo-jet and requires no outside air for its operation.

It is an object of the invention to provide a jet rocket power unit that is light in weight and of simple construction with no moving parts. A feature of the invention is the ease and safety of its use and operation.

The objects and advantages of the invention will appear more fully from the following description and claims in conjunction with the accompanying drawings in which a jet rocket power unit in accordance with the invention is shown by way of example.

In the drawings:

Fig. 1 is an exploded perspective view showing the disassembled parts of a jet rocket power unit in accordance with the invention.

Fig. 2 is an axial section of the assembled power unit taken approximately on the line 2—2 in Fig. 3.

Fig. 3 is a rear end elevation.

Fig. 4 is a fragmentary section taken approximately on the line 4—4 in Fig. 2.

Fig. 5 is a cross section taken on the line 5—5 in Fig. 2 and showing the power unit mounted on the fuselage of a model airplane.

The jet rocket power unit in accordance with the invention as illustrated in the drawings comprises a cartridge case 1 formed of light metal or other strong, light and heat-resistant material. The case 1 is substantially cylindrical. The rear end 2 is open while the forward end 3 is closed and is preferably semi-spherical. In the rounded forward end 3 of the case 1, there is provided a central transversely extending groove 4 which is approximately half round in cross section.

A base washer 5 comprising a circular disc of heat-resistant and heat-insulating material, for example compressed asbestos, fits snugly into the case 1. Because of the convergence of the portion of the case wall forming the rounded end 3, the disc 5 cannot go all the way to the end of the case but seats on the converging wall portion and remains spaced from the end, as shown in Fig. 2.

A cylindrical fuel pellet 6 fits into the case 1 immediately to the rear of the base washer 5. The fuel pellet 6 is of a diameter to slip easily into the case 1 and has a length equal to a major portion of the length of the case. The composition of the fuel pellet is such as to provide a high volume of exhaust gases and a predetermined slow rate of burning. For example, the fuel pellet may be formed of a slow burning nitrate base gun powder of known composition. A suitable fuel pellet is sold by American Telasco Co. of Huntington, N. Y., under the name "Jetex '50' Fuel."

A fuse 7 is provided for igniting the fuel pellet 6. The fuse has a coiled rearward portion 8 adapted to lie against the rear end of the cylindrical fuel pellet and a rearwardly projecting portion 9. Any suitable small diameter fuse can be used, for example one formed of a fine copper wire covered with a slow burning combustible chemical composition. A circular wire mesh disc 10 lies immediately behind the coiled portion 8 of the fuse and has a small notch 11 through which the rearwardly projecting portion 9 of the fuse extends. The disc 10 has a diameter slightly larger than the inside diameter of the case 1 so that it is flexed slightly when pushed into the case and is resiliently and frictionally held in position. It is adapted to be pushed in against the coiled portion 8 of the fuse 7 so as to hold this portion of the fuse firmly against the adjacent end of the fuel pellet 6. The screen disc 5 is woven of fine stainless steel or other heat-resistant wire and is sufficiently fine to keep ashes from the fuel pellet from passing while permitting passage of the gases developed by combustion of the fuel pellet.

The open end 2 of the case 1 is closed by a cap 12 having a rearwardly projecting nozzle portion 13 and an annular flange or skirt portion 14 adapted to surround the rear end portion of the case 1. The inside of the cap 12 is shaped to provide an annular flat face adapted to receive an annular nozzle washer 15. The nozzle washer 15 serves as a gasket between the cap 12 and the case 1 and is formed of asbestos or other suitable heat-resistant gasket material. Inwardly of the nozzle washer 15, the inner surface of the cap is recessed to form an expansion chamber 16 tapering into a nozzle aperture 17. The size of the aperture 17 is calculated to control and utilize most efficiently the flow of gases emanating from the fuel pellet 6 when the latter burns. For example, in a jet power unit in which the case 1 is 1¼ inches long and has a diameter of ⅝ inch, the diameter of the nozzle aperture may be 1/16 inch. The size of the mesh of the screen disc 10 is selected so that the screen disc will not permit the passage of any particle large enough to clog the nozzle aperture.

The outside of the nozzle 13 is stepped or grooved to provide an annular shoulder 18. A spring yoke 20 has diametrically opposite laterally projecting arm portions 21 and a central apertured portion that fits over the nozzle 13 and seats on the shoulder 18. The nozzle 13 and yoke 20 are preferably held in assembled position, as shown in Fig. 2. For this purpose, the portion of the nozzle immediately to the rear of the yoke 20 is upset or otherwise formed so as to hold the yoke 20 loosely in place on the shoulder 18.

The arm portions 21 of the yoke 20 project laterally beyond the periphery of the cap 12 and are apertured to receive the ends of a wire clip 22. The clip 22 is generally U-shaped, having straight leg portions 23 that lie parallel to, and spaced from, opposite side portions of the case 1 and a curved central portion 24 that is adapted to engage the forward end 3 of the case and to seat in the transverse depression 4 (Fig. 4). The curved central portion 24 of the wire clip 22 is connected to the leg portions by integral reversely curved loop portions 25. The rear ends of the leg portions 23 pass through holes in the laterally projecting arms 21 of the spring yoke 20 and are upset, as indicated at 26. The length of the wire clip 22 is such that, when the parts are in assembled position, as illustrated in Fig. 2, the spring yoke 20 is slightly flexed so as to press the cap 12 resiliently against the rear end of the case 1 with the nozzle washer 15 interposed to provide a gasket seal. Preferably, the spring yoke 20 is slightly dished, as shown. If, for any reason, excessive pressure is generated in the case, the spring yoke 20 flexes to permit the escape of gases between the cap 12 and rear end of the case 1, thereby relieving the pressure.

The jet power unit is mounted on a plane by means of a bracket 30 consisting of two like halves. Each of the halves has an elongated flat portion 31 with a hole 32, an inwardly projecting ridge portion 33 merging into an outwardly curved portion 34 terminating in an inwardly facing longitudinal channel 35. The flat portions 31 of the bracket halves are adapted to engage the opposite faces of the fuselage 36 or other structural part of an airplane and to be secured thereto by a bolt or rivet 37 passing through the holes 32. The inwardly projecting ridge portions 33 engage the lower edge of the fuselage 36 to assist in positioning the bracket on the fuselage and to keep it from turning. The inwardly facing longitudinal channel portions 35 are adapted to receive the straight leg portions 23 of the wire clip 22 and thereby hold the assembled power unit. The bracket halves are preferably stamped from sheet metal and are sufficiently resilient as to be sprung apart slightly when the power unit is inserted and thereby hold it resiliently. The projecting arm portions 21 of the spring yoke 20 engage the rear ends of the channel portions 35 of the bracket and thereby transmit the thrust of the rocket unit to the airplane. The curved portions 34 of the bracket embrace, but are spaced from, the case 1 so as to permit the free circulation of air between the case and the bracket and also between the case and the fuselage of the airplane. Thus, the airplane is protected from the heat of the case 1 when the fuel pellet 6 burns.

In using the power unit, the base washer 5, fuel pellet 6, fuse 7 and wire mesh disc 10 are assembled in the case 1, as shown, care being exercised to press the wire mesh disc carefully against the coiled portion of the fuse so as to hold the fuse firmly against the fuel pellet. The rear end of the case is then inserted in the cap 12 in which the nozzle washer 15 has been placed, the straight portion 9 of the fuse being threaded through the nozzle aperture. The central portion 24 of the wire clip 22 is swung over the rounded forward end of the case 1 and snapped into place in the groove 4. The unit is then ready to be mounted on the airplane by slipping the opposite portions of the wire clip 22 into the channeled portions 35 of the bracket 30 and is "started" by lighting the projecting end 9 of the fuse. After use, the unit is readily opened by turning the case 1 90° about its longitudinal axis and thereby disengaging the wire clip 22 from the groove 4 in the forward end of the case.

While the invention has been described with reference to a particular embodiment, it will be understood that it is in no way limited to the specific embodiment illustrated by way of example in the drawings.

What I claim and desire to obtain by Letters Patent is:

1. A jet rocket power unit for a model airplane, comprising a cylindrical case having a dome-shaped integral closure at its front end and open at its rear end, a cylindrical fuel pellet fitting into said case, a fuse having a portion in contact with said pellet, a screen extending across said case behind said pellet and a nozzle having an aperture and fitting on the rear end of said case, a heat-resistant gasket between said nozzle and said case, a spring yoke fitting over said nozzle and having opposite end portions projecting laterally, a U-shaped clip comprising a curved central portion engaging said front end of said case, and integral leg portions extending along opposite sides of said casing, and having end portions affixed to said projecting portions of said yoke, said clip being of such length as to press said yoke resiliently against said nozzle and thereby hold said nozzle resiliently on said case, an end of said fuse extending out through said nozzle, and means for securing said case to a model plane.

2. A jet rocket power unit for a model airplane, comprising a cylindrical case having a dome-shaped integral closure at its front end and open at its rear end, a heat-resistant disc seated in the closed end of said case, a cylindrical fuel pellet fitting into said case and seated on said disc, a fuse having a portion engaging the rear end of said pellet, a circular screen extending across said case behind said pellet and adapted to press said fuse portion against said pellet, a cap closing the rear end of said case, said cap having a central nozzle with an aperture, a heat-resistant gasket between said cap and said case, a spring yoke extending across said cap, said yoke having an opening receiving said nozzle and laterally projecting resilient arms, a U-shaped wire clip comprising a curved central portion engaging said front end of said case, and integral leg portions extending rearwardly along opposite sides of said case with its ends affixed to the arms of said yoke, said clip and case being of such length that said clip and yoke cooperate to hold said cap resiliently on said case, an end of said fuse extending out through the aperture of said nozzle, and clamp means for attaching said case to a model plane.

3. In a jet rocket power unit for a model airplane, a cylindrical case having an integral dome-shaped closure at its front end, said case being adapted to receive a cylindrical fuel pellet, a cap closing the rear end of said case, said cap having a central projecting nozzle, a spring yoke extending across said cap, said yoke having an opening fitting over said nozzle and diametrically opposite resilient arms projecting beyond the periphery of said cap and a U-shaped wire clip comprising a curved central portion engaging the front end of said case, and integral leg portions extending rearwardly along opposite sides of said case with its ends affixed to the arms of said yoke, said clip cooperating with said yoke to hold said cap resiliently on said case.

4. In a jet rocket power unit according to claim 3, the front end of said case having a depression to receive and hold said curved central portion of the clip.

5. In a jet rocket power unit according to claim 3, clamp means gripping said wire clip and adapted to grip a portion of the fuselage of a model airplane to attach said unit to said airplane.

6. In a jet rocket power unit according to claim 5, said clamp having channel portions fitting over the legs of said clip.

References Cited in the file of this patent

UNITED STATES PATENTS

| | | |
|---|---|---|
| 2,617,251 | Hutchison et al. | Nov. 11, 1952 |
| 2,637,162 | Wilmot et al. | May 5, 1953 |
| 2,713,768 | Livingston et al. | July 26, 1955 |